UNITED STATES PATENT OFFICE.

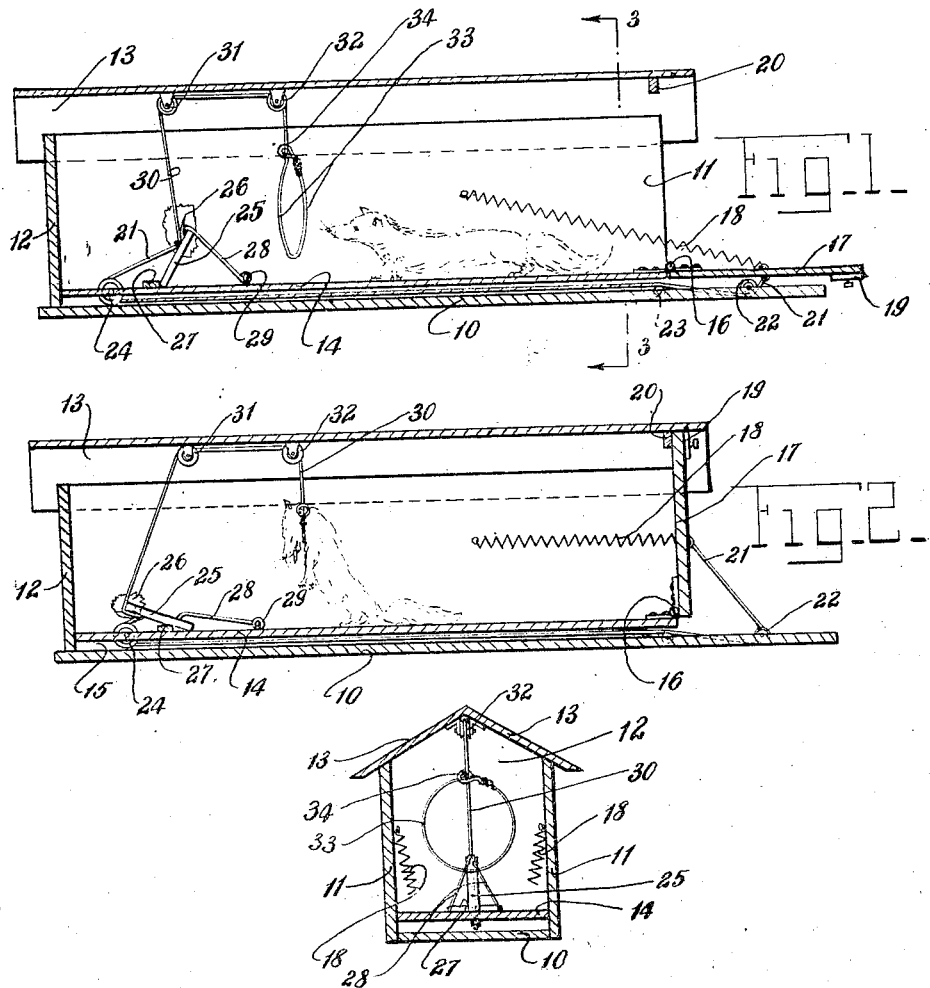

ANTONI LOKAJ, OF NORTHAMPTON, PENNSYLVANIA.

ANIMAL-TRAP.

1,323,400.   Specification of Letters Patent.   Patented Dec. 2, 1919.

Application filed June 18, 1919. Serial No. 305,102.

*To all whom it may concern:*

Be it known that I, ANTONI LOKAJ, a citizen of Poland, residing at Northampton, county of Northampton, and State of Pennsylvania, have invented certain new and useful Improvements in Animal-Traps, of which the following is a specification.

This invention has for its object the provision of a trap adapted to catch small animals, the same operating in the manner of a snare in addition to closing the trap upon disturbing the lure affixed therein.

This object is attained by the novel construction and combination of parts hereinafter described, and shown in the accompanying drawings, forming a material part of this disclosure, and in which—

Figure 1 is a longitudinal sectional view showing the trap in a set or operative position.

Fig. 2 is a similar view of the same, showing the parts in a sprung or operated position, and Fig. 3 is a transverse sectional view taken on line 3—3 of Fig. 1.

Referring to the drawings in detail, the trap will be seen to consist of a platform 10, from which is raised rigid side and end walls respectively 11 and 12, covered by a roof 13, pitched longitudinally from its center in both directions so as to divert rain or the like from the interior of the trap.

An inner flooring 14 is raised from the platform 10, between which is a space 15, and connected with the outer end of the floor 14, by hinges 16, is a door 17, normally drawn to a closed position by a pair of oppositely disposed pull springs 18.

A spring latch 19 is secured upon the outer, upper edge of the door, the same being adapted to hold the door when in a closed position against a cleat or cross piece 20, secured in the peak of the roof 13.

Engaged with the outer side of the door, is one end of a cord 21, the same running over a pulley 22, set in an extension of the platform 10, then over another pulley 23, these pulleys operating in the space 15, as is also the last pulley 24, the inner end of the cord 21 being secured to the back of a trigger strip 25, having at its upper end, the lure 26, the lower end of the trigger strip, when in a set condition, resting against the cleat 27, fixed upon the inner flooring 14.

The trigger strip is normally pressed into operative position by a powerful spring 28, held by an eye 29 fixed in the flooring 14, so that as the lure is moved by the animal trying to nibble on the same, it will displace said trigger and interrupt its engagement with the spring, permitting the door to be shut under the pull of the spring 18, and at the same time another cord 30 running over guide pulleys 31 and 32, fixed in the roof 13, tends to draw up a loop 33, having a running noose 34, through which the animal's head passes in attempting to negotiate the lure 26. Thus in addition to closing the door, the animal is caught in the noose and suspended in the position shown in Fig. 2.

Having thus described my invention what I claim as new and desire to secure by Letter Patent, is—

1. In a trap of the class described, the combination with a hollow box-like structure, a flooring therewithin, a door hinged in the end of said flooring, said door normally extending outward in the manner of a platform, a strip secured transversely on said flooring, a trigger held at one end by said strip, a spring adapted to press against said trigger, a lure carried by said trigger adapted to be displaced by the animal and to disarrange said trigger to be disengaged from said spring, a cord secured to said trigger extending outwardly so as to hold said door in an open position, a loop formed with said cord extending in front of said door, and springs adapted to close said door and to pull said noose tight when said trigger is disturbed.

2. In a trap of the class described, the combination with a hollow rectangular structure having an open end, a flooring raised at the bottom of said structure, and a roof carried thereover, of a door hingedly engaged with said flooring, extending outwardly therebeyond, a trigger, a spring adapted to press against said trigger whereby it is held when in a set position, a lure carried by said trigger, a cord secured at one end to said trigger running over pulleys set in the flooring means holding said door when in a closed position, a noose formed with the outer end of said cord disposed in front of said lure, and a pair of springs attached to said door adapted to close the same upon molestation of said lure and pull said noose into a tight condition.

In testimony whereof I have affixed my signature.

ANTONI LOKAJ.